United States Patent
Zlotnik et al.

(10) Patent No.: US 12,467,913 B2
(45) Date of Patent: Nov. 11, 2025

(54) PORTABLE ODOR DETECTION SYSTEM

(71) Applicants: Clifford B. Zlotnik, Sewickley, PA (US); Harry J. Velgich, McMurray, PA (US)

(72) Inventors: Clifford B. Zlotnik, Sewickley, PA (US); Harry J. Velgich, McMurray, PA (US)

( * ) Notice: Subject to any disclaimer, the term of this patent is extended or adjusted under 35 U.S.C. 154(b) by 560 days.

(21) Appl. No.: 18/101,881

(22) Filed: Jan. 26, 2023

(65) Prior Publication Data

US 2023/0236162 A1    Jul. 27, 2023

Related U.S. Application Data

(60) Provisional application No. 63/303,175, filed on Jan. 26, 2022.

(51) Int. Cl.
| | |
|---|---|
| *G01N 33/00* | (2006.01) |
| *B01D 53/02* | (2006.01) |
| *B01J 20/24* | (2006.01) |
| *B01J 20/26* | (2006.01) |
| *B01J 20/28* | (2006.01) |

(52) U.S. Cl.
CPC ......... *G01N 33/0027* (2013.01); *B01D 53/02* (2013.01); *B01J 20/24* (2013.01); *B01J 20/262* (2013.01); *B01J 20/28035* (2013.01); *B01D 2253/102* (2013.01); *B01D 2253/20* (2013.01); *B01D 2253/25* (2013.01); *B01D 2257/90* (2013.01)

(58) Field of Classification Search
CPC .................................................. G01N 33/0027
USPC ....................................................... 73/23.34
See application file for complete search history.

(56) References Cited

U.S. PATENT DOCUMENTS

| | | | |
|---|---|---|---|
| 2002/0116983 A1* | 8/2002 | Bao ..................... | G01N 27/4148 73/23.34 |
| 2008/0293614 A1* | 11/2008 | Bishop ................... | B01J 20/183 405/129.9 |

FOREIGN PATENT DOCUMENTS

WO    WO-2020149216 A1 *    7/2020  .............. C08J 7/043

OTHER PUBLICATIONS

Okamura. Translation of WO-2020149216-A1. Published Jul. 2020. Accessed Sep. 2025. (Year: 2020).*

* cited by examiner

*Primary Examiner* — Walter L Lindsay, Jr.
*Assistant Examiner* — Philip T Fadul
(74) *Attorney, Agent, or Firm* — Steven R. Fairchild

(57) ABSTRACT

The present invention relates to the isolation and amplification of odors so that the underlying odorous material might be located. The present invention utilizes a triple layer odor absorbent sampling media, solvents, and a heat source to isolate and amplify the odors. Once the source of the odor is located, the odorous material can then be cleaned.

16 Claims, 5 Drawing Sheets

PORTABLE ODOR DETECTION SYSTEM

CROSS REFERENCE TO RELATED APPLICATION

This application claims the benefit of US Provisional Patent Application No. 63/303,175, filed on Jan. 26, 2022, and incorporated herein by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present invention is a portable odor detection method and system, which assists the user in determining the absence or presence of an odorous substance on a target substrate: by desorbing, accelerating, concentrating, containing and collecting odor emission from a substrate onto an absorbent media for olfactory examination in situ.

BACKGROUND OF THE INVENTION

The need exists for a portable, technologically simple, effective and low cost method for quickly determining whether a surface or material is emitting detectable levels of odor in situ.

To one investigating an odor, it's initially more important to identify the location of the source of the odor than it is to precisely know what the odor is. Once the location of the source of the odor is identified, there is always a remedy, ranging from spot treatment to surface removal.

Odor objectivity is the odor that is actually present at a place and time while odor subjectivity is influenced by emotion and experiences. For example, a house-fire can be a highly emotional experience for homeowners and occupants. Following successful fire restoration, restored building materials and personal property should not retain (olfactory) noticeable fire related smoke odors. As odor subjectivity is influenced by emotion and experiences people traumatized by a fire event will retain an olfactory memory of the event, such that similar smells may trigger memories of the house-fire and the associated emotions, in contrast, someone who has not had the personal house-fire experience might not be disturbed by similar smells.

A conventional approach to odor determination is to take air samples, surface samples, or material samples and send them to a laboratory for analysis. In order for sampling and lab analysis to be effective in identifying the potential source(s) of odor, the odorous substance must fall within the range of the sampling method, lab equipment, and analysis methods.

The laboratory will analyze the samples and report what substances are found in the samples. As substances vary widely in odorousness, some of the substances found by the lab may not contribute to the odor while other highly odorous substances may fall below the level of detectability. The laboratory findings will often contain such extraneous information.

Moreover, sending samples to a laboratory involves time and shipping costs. In addition, it is common for samples to quickly degrade over time. Lab sampling is more accurately reflective of the sample that arrives in the laboratory rather than the sample when freshly taken.

Further, prior methodology typically involves the destruction, partial or full, of the odorous source where it is removed and examined in a neutral or clean odor environment by "sniff testing."

A surface sampling method known as "patch testing" involves placing an adsorbent material (folded paper towel) over the target surface, covering the adsorbent material with a larger sized section of aluminum foil, taping the foil in place and waiting 24-48 hours for the adsorbent material to adsorb odor from the surface and microenvironment.

An example of odor detection includes WO2014045478, which discloses an odor testing kit that includes, at least, 2 pieces of odor adsorbent material. The first odor adsorbent material is placed where odor is to be detected and the other piece remains as an unexposed, control piece. After the first piece is exposed in the area to be tested, it is compared to the unexposed, control piece to determine if there are differences which will indicate presence of an odor.

Another example includes EP0317299, which discloses a compact detector that detects odors as an output ratio between gas sensors, the detection results provided by the gas sensors are displayed as an output signal. Then, an ozone gas is generated to clean the sensors and the chamber.

Another example includes WO02017206142, which discloses a portable electronic device with a sampling unit that has a suction air pump, detection chamber, heat-based odor sensor that decomposes gas molecules into charged ions to be converted into electric signals that are used to produce test results.

Another example includes U.S. Pat. No. 5,447,869, something was missing so I cut and pasted this info in Method of detecting bitter or odorous substances and apparatus therefor.

It would be desirable to have a portable odor detection device that allows the user to quickly and cost effectively determine the absence or presence of odor on a substrate quickly onsite without: causing damage, delays, and the added costs of laboratory analysis to send to send to a laboratory for a costly analysis. Furthermore, it would also be desirable to have a device that can be used to survey a broad range of substrata to determine which surfaces are odor reservoirs that are emitting odors and which are not.

Still, further, it would be desirable to have a device that can provide qualitative information of the thoroughness of remediation processes.

Therefore, there currently exists a need in the industry for a process that can, quickly, easily and cost effectively determine the absence or presence of odors on substrate.

The foregoing prior art does not describe the present invention.

SUMMARY OF THE INVENTION

A method of detecting odors in a target area, comprising:

In a first step, applying a triple layer odor absorbent sampling media to the target area;

In a second step, applying a liquid solvent to the triple layer odor absorbent sampling media of the first step;

In a third step, enclosing the triple layer odor absorbent sampling media of the second step with an impermeable sample cover;

In a fourth step, enclosing the triple layer odor absorbent sampling media of the third step with a weighted circular ring wherein said weighted circular ring contains a heat sensor probe that connects to the triple layer odor absorbent sampling media when said weighted circular ring encloses said triple layer odor absorbent sampling media;

In a fifth step, placing a weighted rack over the triple layer odor absorbent sampling media of the fourth step wherein said weighted rack houses a heating source;

In a sixth step, heating the triple layer odor absorbent sampling media of the fifth step using said heating source of the fifth step;

In a seventh step, removing the heat from the absorbent sampling media of the sixth step;

In an eighth step, transporting the absorbent sampling media of the seventh step to a person who specializes in the smelling of odors.

The method of detecting odors in [0020] wherein triple layer odor absorbent sampling media is comprised of
A bottom layer made of an absorbent media
A middle layer made of a flexible, heat resistant barrier
A top layer made of an absorbent media
A fastener to connect the bottom layer, middle layer, and top layer to one another.

The triple layer odor absorbent sampling media of [0021] wherein the flexible, heat resistant barrier is mylar plastic The triple layer odor absorbent sampling media of [0021] wherein the absorbent media is either blotter paper or filter paper.

The method of detecting odors in [0020] wherein the liquid solvent contains distilled water.

The method of detecting odors in [0020] wherein the liquid solvent contains ether.

The method of detecting odors in [0020] wherein the liquid solvent contains acetone.

The method of detecting odors in [0020] wherein the liquid solvent contains a surfactant.

A method of detecting odors in a target area, comprising:

In a first step, applying a liquid solvent the target area;

In a second step, applying a triple layer odor absorbent sampling media to the target area and solvent of the first step;

In a third step, enclosing the triple layer odor absorbent sampling media of the second step with an impermeable sample cover;

In a fourth step, enclosing the triple layer odor absorbent sampling media of the third step with a weighted circular ring wherein said weighted circular ring contains a heat sensor probe that connects to the triple layer odor absorbent sampling media when said weighted circular ring encloses said triple layer odor absorbent sampling media;

In a fifth step, placing a weighted rack over the triple layer odor absorbent sampling media of the fourth step wherein said weighted rack houses a heating source;

In a sixth step, heating the triple layer odor absorbent sampling media of the fifth step using said heating source of the fifth step;

In a seventh step, removing the heat from the absorbent sampling media of the sixth step;

In an eighth step, transporting the absorbent sampling media of the seventh step to a person who specializes in the smelling of odors.

The method of detecting odors in [0028] wherein triple layer odor absorbent sampling media is comprised of
A bottom layer made of an absorbent media
A middle layer made of a hard barrier
A top layer made of an absorbent media
A fastener to connect the bottom layer, middle layer, and top layer to one another.

The triple layer odor absorbent sampling media of [0029] wherein the hard barrier is mylar plastic.

The triple layer odor absorbent sampling media of [0029] wherein the absorbent media is either blotter paper or filter paper.

The method of detecting odors in [0028] wherein the liquid solvent contains distilled water.

The method of detecting odors in [0028] wherein the liquid solvent contains ether.

The method of detecting odors in [0028] wherein the liquid solvent contains acetone.

The method of detecting odors in [0028] wherein the liquid solvent contains a surfactant.

BENEFITS OF THE PRESENT INVENTION

The benefits of this invention include:
(1) Determining whether or not a surface is emitting a detectable odor. A detectable odor is when the subject smells something and is unable to precisely identify what he or she smells.
(2) Determining whether or not a surface is emitting an identifiable odor. An identifiable odor is an odor that is both detected and present in sufficient quantity to be identified. For this, a placebo is recommended. A placebo is an inactive substance that it is used as a control experiment to determine whether or not the control subject can differentiate between sample blank and a sample where the target odor is present.
(3) Provide quality control on damage mitigation projects.
(4) Sampling both structural materials and personal property.
(5) Indoor environmental quality.
(6) Determining which surfaces and/or materials in an environment are odor reservoirs (i.e., odor mapping).
(7) Post-traumatic stress-provide peace of mind. Restore trust and confidence in remediation and mitigation by affording the opportunity for stakeholders to confirm that their property has been returned to an odor-free condition by performing their own testing. Built-in stress testing is done using known odor amplifiers of heat and humidity.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF THE PREFERRED EMBODIMENTS

Figure 1:
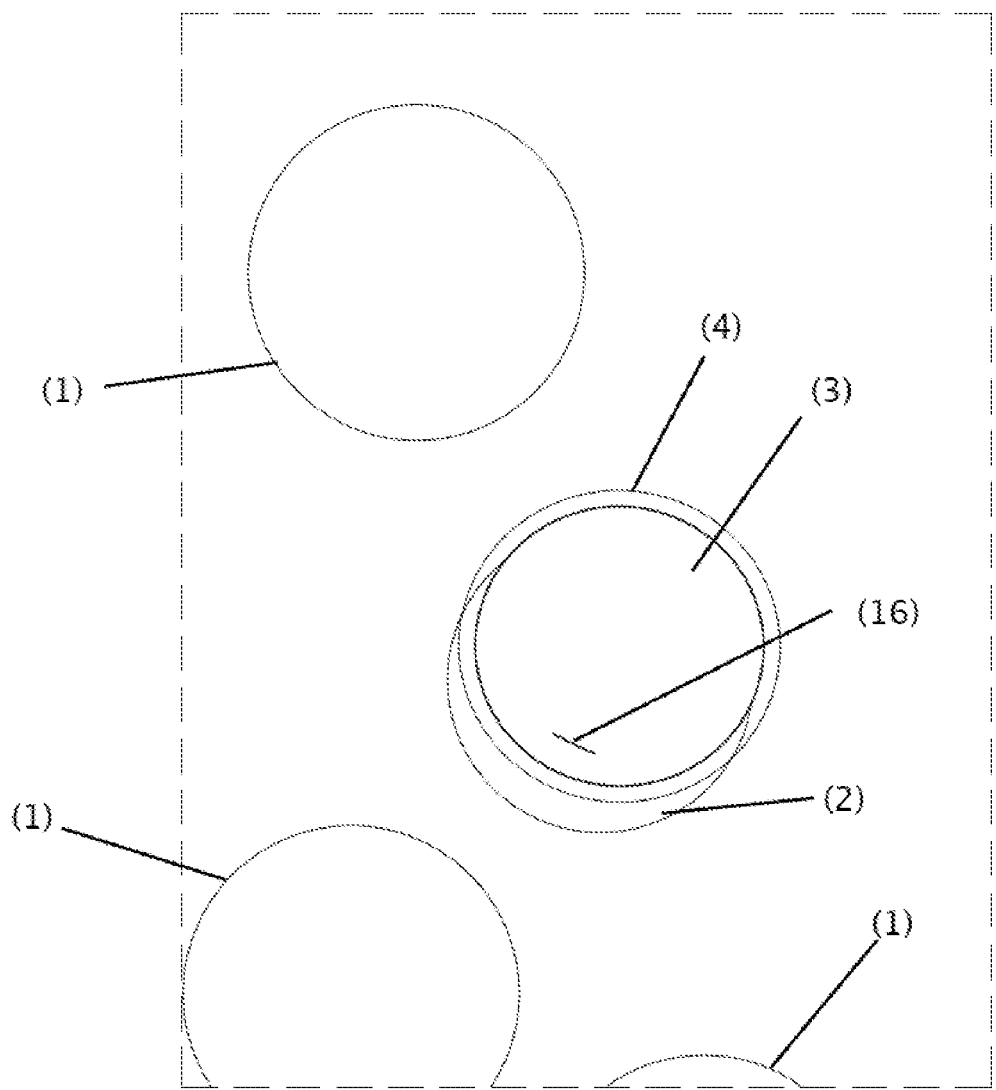
FIG. 1 depicts the application of the sampling media to a single target area amidst multiple other sampling areas.

For a more complete understanding of the present invention, the objects and advantages thereof, reference is now made to the ensuing descriptions.

The present invention is a portable odor detection method and system, which assists the user in determining either the absence or presence of an odorous substance on a target substrate. This occurs by desorbing, accelerating, concentrating, containing and collecting odor emission from a substrate onto an absorbent media for olfactory examination in situ.

Odors are known to be more noticeable when temperature and relative Humidity increase. The present invention increases temperature and relative humidity, which increases the activity of odors making them more likely to be noticeable.

Samples may be taken with the device positioned vertically, horizontally, or upside down. Within an enclosed area, samples may be taken on walls, ceilings and floors as well as on a wide variety of personal property. Samples may be taken on both porous and nonporous surfaces. Samples can be taken without damaging the target surface.

In addition, through controls and recording mechanisms, the system can provide accurate and consistent sampling replication.

Liquid Solvent

A solvent is a substance (usually a liquid) that is capable of dissolving another substance. Water is known as the "universal solvent" as more substances are soluble in water than in any other substance. However, water doesn't dissolve greasy or oily substances. In order to dissolve oily or greasy substances, water needs chemical "help" either in the form of surfactants and or nonaqueous solvents such as ethers or acetone.

The utilization of liquids in "odor hunting" varies according to the material and surface being sampled and the characteristics of the odor emitting substance.

Water, alcohols (e.g. isopropyl, ethyl, etc.), ethers (e.g. diethyl, etc.) and acetone are four of the basic solvents utilized in "odor hunting" because many odorous substances are soluble in these solvents and combinations of these solvents. Other solvent liquids can be used depending on the unique characteristics of a suspected or known substance.

A cotton swab can be dipped in solvent to determine if a colored target substance is soluble in the chosen solvent. Preferably, the same solvent is tested on the target surface in inconspicuous area. Cotton swab dipped in solvent can be compared to media sample dampened with solvent and sniffed for anomalies.

Liquid solvents are utilized in odor hunting several different ways. Including, the following:

(1) Indirect application—the application of distilled water to the upward facing side of media to raise humidity during sampling;
(2) Direct application to surfaces and materials—where water dissolves water soluble (hydrophilic) substances on the surface and transfers it to the test media;
(3) Direct application to surfaces and materials—water and water miscible additives dissolve solution soluble substances on the surface and transfers them to the test media (e.g. greasy, oily residues, etc.);
(4) Direct application to surfaces and materials, where nonaqueous solvent dissolves solution soluble substances on the surface (e.g. paints and other surface coatings, burnt/melted plastics, etc.); and,
(5) Liquid penetrates porous surface (e.g. wood framing materials after abrasive blasting, concrete, etc.)

In a preferred embodiment, the liquid solvent is composed of water, ethyl alcohol, water-alcohol-emulsifier blend, water-ether blend, and a water-ether-emulsifier blend. This composition is useful to draw odors out of materials.

Solvents such as water, ethyl alcohol, and ether are preferred as they dissolve and suspend odorous substances, which can be captured on absorbent media. These solvents are effective penetrants and can penetrate porous surfaces to dissolve and suspend substances, which can be captured on absorbent media. The addition of emulsifiers breaks surface tension and enhances penetration.

Non-limiting examples of solvents include: (1) distilled water; (2) distilled water plus a surfactant (to break surface tension); (3) distilled water plus ether; and, (4) distilled water+ether+surfactant.

As used herein, a surfactant is a chemical that reduces the surface tension of water. Non-limiting examples of surfactants include emulsifiers, detergents, and wetting agents.

The following are various solvent sampling formulations, by weight, which are appropriate for this invention. These are starting formulae and there are many combinations of these and other ingredients, which are suitable for this invention.

The percentages in these formulae can be converted to grams when using the gram scale. For example, an 89.5 grams-purified water plus 5 grams diethyl ether and 5 grams acetone, and 0.5 grams surfactant equals 100 grams.

Aqueous Based
(1) 100% purified water;
(2) 70% purified water, 29.5% isopropyl alcohol, 0.5% surfactant;
(3) 90% purified water, 10% diethyl ether;
(4) 90% purified water, 10% acetone;
(5) 89.5% purified water, 10% diethyl ether. 0.5% surfactant;
(6) 89.5% purified water, 10% acetone, 0.5% surfactant; and,
(7) 89.5% purified water, 5% diethyl ether, 5% acetone, 0.5% surfactant.

Isopropyl Alcohol Based
(1) 100% medical grade isopropanol;
(2) 80% medical grade isopropanol, 19.5% purified water, 0.5% surfactant;
(3) 80% medical grade isopropanol, 10% purified water, 5% diethyl ether, 5% acetone; and,
(4) 79.5% medical grade isopropanol, 10% purified water, 5% diethyl ether, 5% acetone, 0.5% surfactant Ethyl Alcohol Based
(1) 100% Government Formula A 95% ethyl alcohol;
(2) 80% Government Formula A 95% ethyl alcohol, 19.5% purified water, 0.5% surfactant;
(3) 80% Government Formula A 95% ethyl alcohol, 10% purified water, 5% diethyl ether, 5% acetone; and,
(4) 79.5% Government Formula A 95% ethyl alcohol, 10% purified water, 5% diethyl ether, 5% acetone, 0.5% surfactant In a preferred embodiment, the invention contains a kit with the following raw materials related to solvents.

Solvent Accessory Kit
(1) Glass bottle containing a reservoir of purified water (deionized or distilled);
(2) Glass bottle containing a reservoir of 99% medical grade isopropyl alcohol and 1% purified water;
(3) Glass bottle containing ethyl alcohol Government Formula A 95%;
(4) Glass bottle containing diethyl ether;

(5) Glass bottle containing acetone; and,
(6) Glass bottle containing nonionic surfactant such as Triton X-100 or
Igepal™ 630 CA630, which is sold by Thermo Fisher Scientific, Inc.

Other Accessory Kit

In a preferred embodiment, the invention is sold as a kit the following additional items:
(1) Portable Gram Scale. Suitable versions include the Digital Pocket Scale
UF200H, 200 g×0.01 g, sold by Fuzion™.
(2) 4 Ounce glass bottles with droppers
(3) Plastic mist bottles
(4) Disposable transfer pipettes (disposable)

Triple Layer Odor Absorbent Sampling Media

The triple layer odor absorbent sampling media utilizes a liquid and chemical barrier material that is sandwiched between two layers of absorbent media. This is demonstrated as Item (3) in FIG. 1.

In a preferred embodiment, the present invention utilizes clear mylar plastic that is sandwiched and secured (stapled) between two similarly sized pieces of absorbent media (e.g. blotter paper, filter paper).

In preferred embodiment, it utilizes an extension handle, which allows samples to be maneuvered and held in position during testing and quickly removed afterwards. In a preferred embodiment, these are individually packaged in an odor barrier material.

The simultaneous use of activated carbon (e.g. pelletized activated carbon, activated carbon tablet, activated impregnated filter media, etc.) with capture a sample which can be sent to laboratory for analysis.

The triple layer odor absorbent sampling media can be made in various shapes. This includes square or triangular to fit into corners. Further, the bottom plate may include built-in transparent media cover and padded surface to protect target surface.

Other Components

The present invention also utilizes a clear impermeable media cover. This corresponds to Item (4) in FIG. 1. In a preferred embodiment, it is made from glass, plexiglass, mylar plastic, cellophane, or a circular ring of aluminum foil with a clear mylar inner circle attached with aluminum tape.

In a preferred embodiment, the media cover is larger than the triple layer odor absorbent sampling media, described above.

The present invention also utilizes a metal tripod rack with upper center ring.

In a preferred embodiment, the legs are 6" long. The outer diameter of the ring is 4 9/16" while the diameter of the center hole is 3". This is demonstrated in FIG. 5.

A commercially available suitable version of this item is the 6" tripod with mesh screen (145.0312), sold by Gaber & Company™ (GABER & COMPANY USA, Inc.). Available at https://www.gaberandcompany.com/ecommerce/jewelry-tools/bench-lamps/6%22-tripod-w-mesh-screen-145-0312.cfm (last accessed, Jan. 20, 2023).

The present invention also utilizes a lower center ring which has a groove to allow passage of heat sensor. In a preferred embodiment, the item has a 7" outer diameter while the diameter of the center hole is 4". In a preferred embodiment, this ring is made of plastic, wood, metal, fiberglass, or any material that allows the passage of the heat sensor.

The present invention also utilizes a variable temperature electric heat source. In a preferred embodiment, the heat source is an adjustable heat gun. A commercially available suitable version of this item is the PRULDE™ PLD2030S Heat Gun Variable Temperature, Hot Air Gun with LCD Digital Display, 120 F-1200 F Temperature & Air Flow Adjustable, manufactured by PRULDE. See, e.g., https://www.amazon.com/N2030-Temperature-120% C2% B0F-1200% C2% B0F-Protection-Attachments/dp/B07FS5DQ2H (last accessed Jan. 20, 2023).

Initiating heat raises the available moisture in the microenvironment beneath the slip and the Water Activity (AW), or relative humidity of the material being tested.

The present invention also utilizes a copper extension pipe. In a preferred embodiment, the item is 1.5" diameter plumbing 2" copper ring coupling. A suitable commercially available versions of this item is the Coupling With Roll Stop, manufactured by ELKHART™ as SKU 30764. Available at https://www.elkhartproducts.com/products/167 #/criteria (last accessed, Jan. 20, 2023).

The present invention also utilizes a thermocouple thermometer. In a preferred embodiment, this item is a battery powered and handheld model. A suitable commercially available version includes the MTC Mini Thermocouple Model K, manufactured by ThermoWorks™. Available at https://www.thermoworks.com/mtc/(last accessed, Jan. 20, 2023).

The present invention also utilizes a remote sensor. Suitable commercially available versions of this item include the ThermoWorks Mini Needle Probe 3.35" (K-183/4) or the ThermoWorks Q-Series Type K Cooking Probe with Right Angle Bend.

Invention Steps

Reference is made to FIGS. 1-5. A common numbering system is used throughout all figures.

The following steps are in accordance with the present invention.

First, the triple layer odor absorbent sampling media is then placed on a target area. This is demonstrated in FIG. 1. As shown, Item (1) designates outlines of various circular target areas to be sampled in the future, or have already been sampled by the operator. Item (2) designates the current target area. Item (3) designates the triple layer odor absorbent sampling media. Item (4) designates a plastic cover for the triple layer odor absorbent sampling media. Item (16) designates the staple used to maintain the layers of the triple layer odor absorbent sampling media.

Second, desorbent liquid solvent is applied to the triple layer odor absorbent sampling media.

The sampling area itself may be un-moistened. Alternatively, it may be directly or indirectly moistened by misting.

Figure 2:
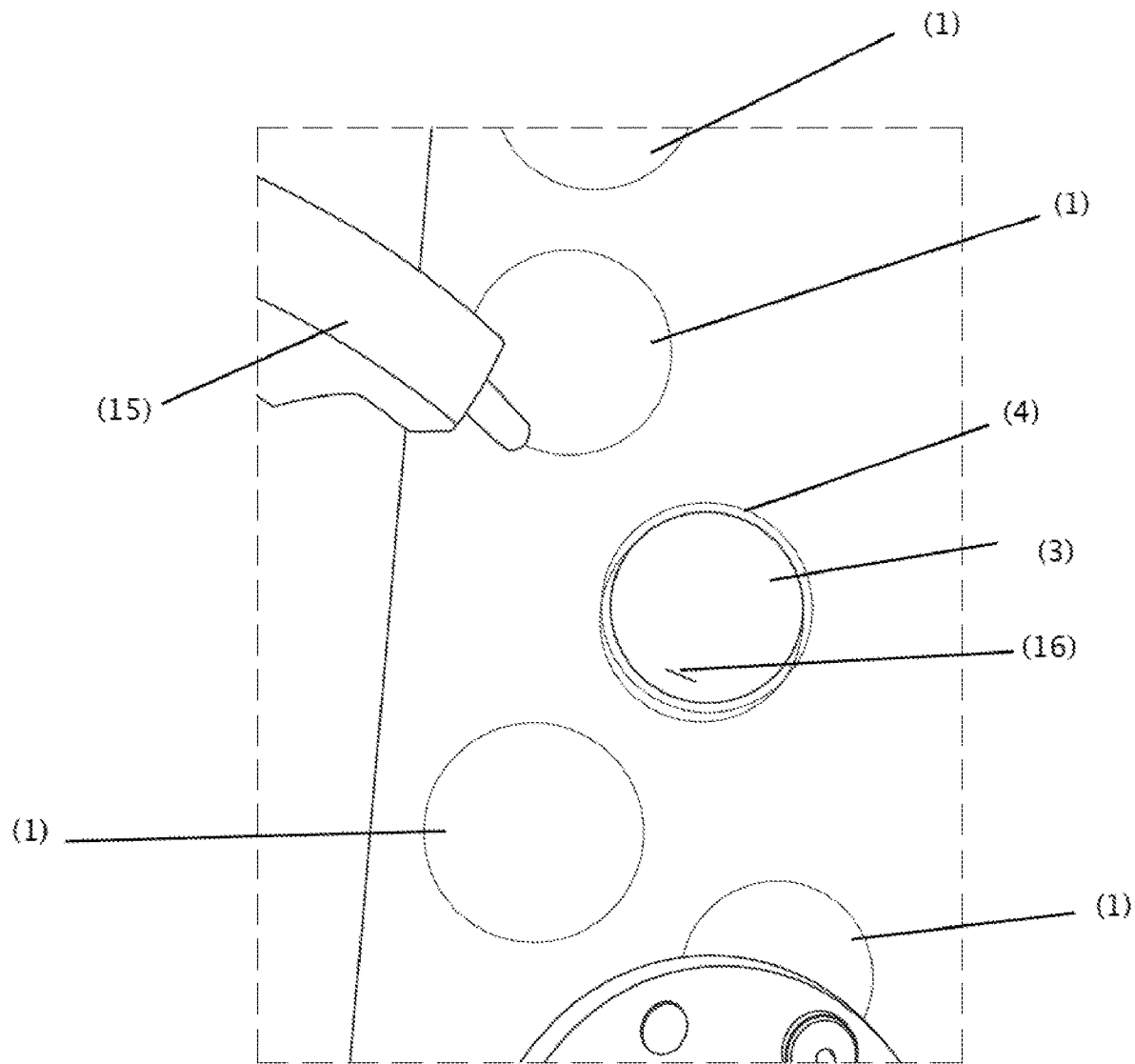
FIG. 2 depicts the moistening of the target area.

Reference is made to FIG. 2. As shown, Item (15) designates the spray bottle used to dampen the upward facing sampling media, Item (3). In this process, moisture is being provided indirectly.

In another embodiment, the first two steps are reversed. For instance, the mist purified water on the downward surface of media prior to its installation over the target substrate area. In that process, moisture is being provided indirectly.

Alternatively, the misting of purified moisture is applied directly on the surface being tested. This allows the moisture to penetrate the pores of the surface of the target area.

Third, the sample is then enclosed by an impermeable transparent sample cover. This is demonstrated by Item (4) of FIG. 1). In a preferred embodiment, it is centrally placed atop the absorbent media.

Figure 3:
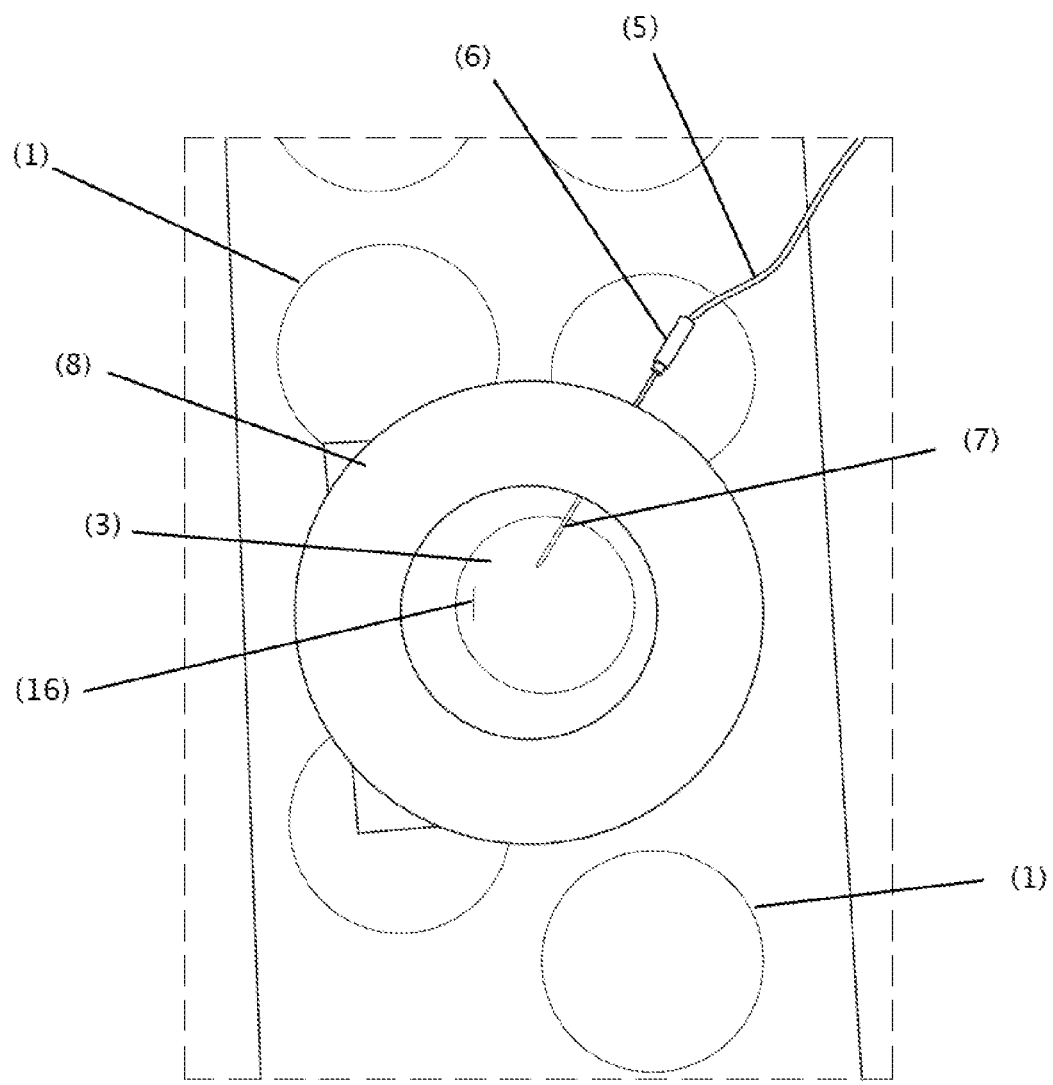
FIG. 3 depicts the bottom side of the ring with a heat probe under the media, which was the originally intended placement of the probe.

Fourth, the sample enclosed by a weighted circular ring with a heat sensor probe administered, as depicted in FIG. 3. As shown, Item (5) depicts the heat sensor probe's wire, which connects the heat sensor probe (6) to the electronic display. Item (7) depicts the heat sensor probe needle, which is inserted over or under the sample media (3), depending on the user's preference. Item (8) depicts the circular ring, which holds the heat sensor in place.

In another embodiment, the weighted ring has scuff resistant felt coating for delicate surfaces.

Figure 4:
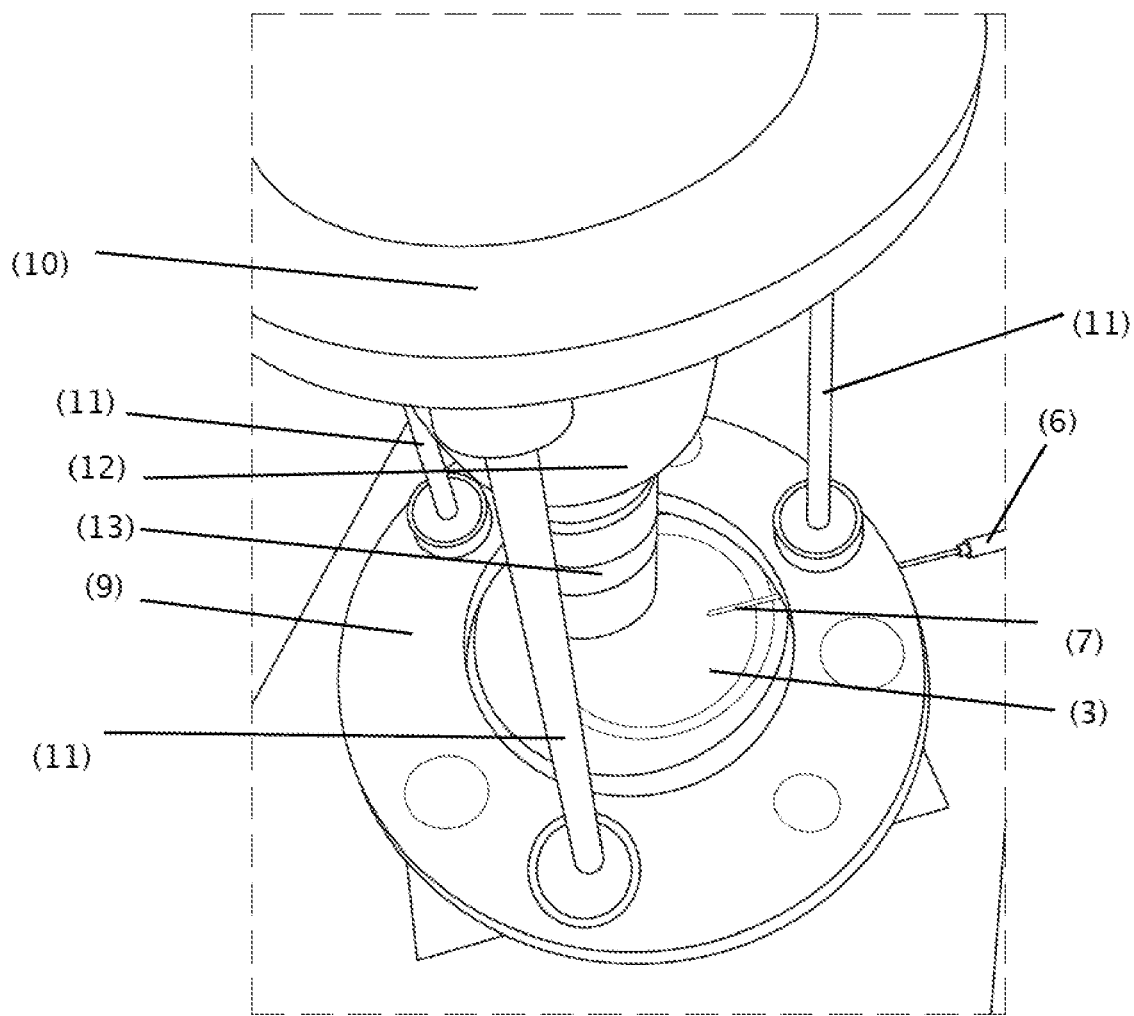
FIG. 4 depicts the topside of the ring with a heat probe positioned on top of the target sample media.

Fifth, a weighted rack containing the exterior heating element is then placed over the sample cover. This is depicted in FIG. 4. Specifically, FIG. 4 shows the topside of the ring with the heat probe positioned on top of the media. As shown, the weighted rack is a tripod with a lower ring, Item (9), an upper ring, Item (10), and three cylinders or legs, Item (11). This apparatus holds the heat source, Item (12), in place over the sample and positioned heat sensor.

In a preferred embodiment, the programmable heat source is fit with a 2" long×1.5" O.D. thermally conductive copper discharge extension, Item (13), that discharges heat.

Figure 5:
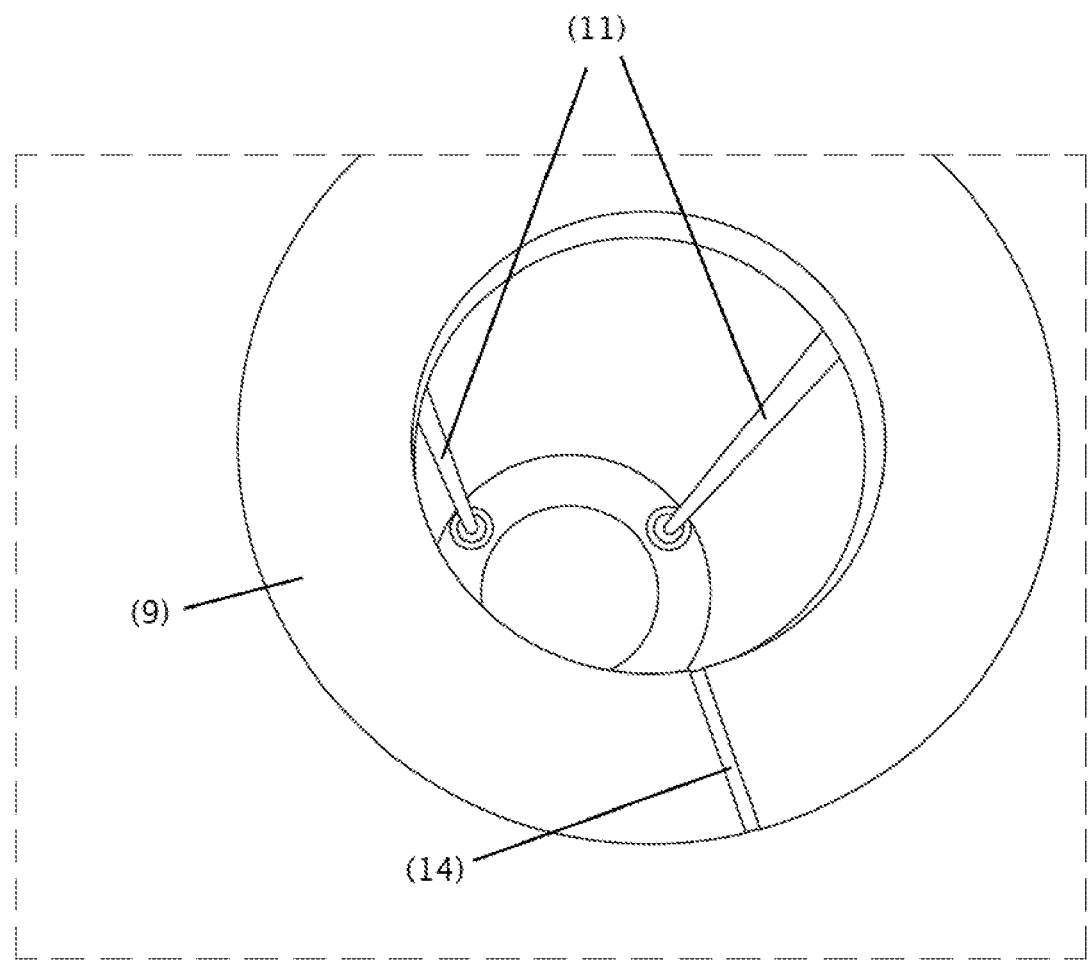
FIG. 5 depicts the underside of the lower ring with the groove for the heat probe.

In a preferred embodiment, the device has a groove in the lower ring which can fit the heat sensor. This is shown in FIG. 5, which is a lower view of the device. As shown, Item (14) is a longitudinal groove in the lower ring, Item (9). Two tripod legs, Item (11), are shown leading away from the lower ring, Item (9)

In a preferred embodiment, the tripod legs are adjustable in height.

In a preferred embodiment, heat source fits securely into the upper ring.

In a preferred embodiment, the racks can be screwed into place or held in place by powerful magnets that secure the tripod and the opening for thermostat probe. These magnets hold the tripod rack horizontally and vertically.

Preferred examples of such include neodymium magnets. Additionally, magnets with L brackets can be used to attach the thermometer and/or sensor to the same apparatus.

In a preferred embodiment, the tripod legs are removable for shipping and to fit in carrying case.

In a preferred embodiment, the optimal distance between the heat source discharge and the cover plate is between 1.5" and 3".

Optimal distance 3" or 1.5" between heat source discharge and cover plate. Option of variable heights by adjusting legs.

Sixth, the enclosed area is then heated to a variable and suitable sampling temperature between ambient room temperature and a temperature not deleterious to either the target surface or the system components, which causes desorption of odor vapor from the target surface at an accelerated rate. In a preferred embodiment, it is heated to 145 degree Fahrenheit.

In a preferred embodiment, the heat source has a view screen and adjustable settings to control the heat application.

In a preferred embodiment, the operator attaches both view screens (heat source and thermometer) to the tripod to view them simultaneously.

The heating allows the desorbed odor to concentrated in a small contained space where it is collected onto the adsorbent material.

Seventh, the heat is removed and the sample cover is removed and triple layer odor absorbent sampling media is placed in a plastic bag for transport to a person specialized in sniffing odors. This sniffer can then determine the absence or presence of odor. Olfactory impression from the sample allows the user to make a qualitative olfactory based decision on the absence or presence of odor based upon the sampling result.

We claim:

1. A method of detecting odors in a target area, comprising:
    in a first step, applying a triple layer odor absorbent sampling media to the target area;
    in a second step, applying a liquid solvent to the triple layer odor absorbent sampling media of the first step;
    in a third step, enclosing the triple layer odor absorbent sampling media of the second step with an impermeable sample cover;
    in a fourth step, enclosing the triple layer odor absorbent sampling media of the third step with a weighted circular ring wherein said weighted circular ring contains a heat sensor probe that connects to the triple layer odor absorbent sampling media when said weighted circular ring encloses said triple layer odor absorbent sampling media;
    in a fifth step, placing a weighted rack over the triple layer odor absorbent sampling media of the fourth step wherein said weighted rack houses a heating source;
    in a sixth step, heating the triple layer odor absorbent sampling media of the fifth step using said heating source of the fifth step;
    in a seventh step, removing the heat from the absorbent sampling media of the sixth step;
    in an eighth step, transporting the absorbent sampling media of the seventh step to a person who specializes in the smelling of odors.

2. The method of detecting odors in claim 1 wherein triple layer odor absorbent sampling media is
    comprised of: a bottom layer made of an absorbent media; a middle layer made of a flexible, heat resistant barrier; a top layer made of an absorbent media; a
    fastener to connect the bottom layer, middle layer, and top layer to one another.

3. The triple layer odor absorbent sampling media of claim 2 wherein the flexible, heat resistant barrier is mylar plastic.

4. The triple layer odor absorbent sampling media of claim 2 wherein the absorbent media is either blotter paper or filter paper.

5. The method of detecting odors in claim 1 wherein the liquid solvent contains distilled water.

6. The method of detecting odors in claim 1 wherein the liquid solvent contains ether.

7. The method of detecting odors in claim 1 wherein the liquid solvent contains acetone.

8. The method of detecting odors in claim 1 wherein the liquid solvent contains a surfactant.

9. A method of detecting odors in a target area, comprising:
    in a first step, applying a liquid solvent to the target area;
    in a second step, applying a triple layer odor absorbent sampling media to the target area and solvent of the first step;
    in a third step, enclosing the triple layer odor absorbent sampling media of the second step with an impermeable sample cover;
    in a fourth step, enclosing the triple layer odor absorbent sampling media of the third step with a weighted circular ring wherein said weighted circular ring contains a heat sensor probe that connects to the triple layer odor absorbent sampling media when said weighted circular ring encloses said triple layer odor absorbent sampling media;

in a fifth step, placing a weighted rack over the triple layer odor absorbent sampling media of the fourth step wherein said weighted rack houses a heating source;

in a sixth step, heating the triple layer odor absorbent sampling media of the fifth step using said heating source of the fifth step;

in a seventh step, removing the heat from the absorbent sampling media of the sixth step;

in an eighth step, transporting the absorbent sampling media of the seventh step to a person who specializes in the smelling of odors.

10. The method of detecting odors in claim 9 wherein triple layer odor absorbent sampling media is
comprised of: a bottom layer made of an absorbent media; a middle layer made of a flexible, heat resistant barrier; a top layer made of an absorbent media; a
fastener to connect the bottom layer, middle layer, and top layer to one another.

11. The triple layer odor absorbent sampling media of claim 10 wherein the flexible, heat resistant barrier is mylar plastic.

12. The triple layer odor absorbent sampling media of claim 10 wherein the absorbent media is either blotter paper or filter paper.

13. The method of detecting odors in claim 9 wherein the liquid solvent contains distilled water.

14. The method of detecting odors in claim 9 wherein the liquid solvent contains ether.

15. The method of detecting odors in claim 9 wherein the liquid solvent contains acetone.

16. The method of detecting odors in claim 9 wherein the liquid solvent contains a surfactant.

* * * * *